US008191038B1

(12) United States Patent
Samuel et al.

(10) Patent No.: US 8,191,038 B1
(45) Date of Patent: May 29, 2012

(54) USING A TEMPLATING LANGUAGE TO PRODUCE A HOST LANGUAGE FACTORY FOR A SAFE SUBSET OF A TEMPLATED LANGUAGE

(75) Inventors: Michael V. Samuel, San Francisco, CA (US); Bennet R. T. Laurie, London (GB)

(73) Assignee: Google Inc., Mountain View, CA (US)

( * ) Notice: Subject to any disclaimer, the term of this patent is extended or adjusted under 35 U.S.C. 154(b) by 1177 days.

(21) Appl. No.: 11/869,645

(22) Filed: Oct. 9, 2007

(51) Int. Cl.
*G06F 9/44* (2006.01)
*G06F 9/45* (2006.01)

(52) U.S. Cl. ......... 717/106; 717/109; 717/136; 717/153

(58) Field of Classification Search .................. None
See application file for complete search history.

(56) References Cited

U.S. PATENT DOCUMENTS

| | | | | |
|---|---|---|---|---|
| 6,484,150 | B1 * | 11/2002 | Blinn et al. ................ | 705/26.81 |
| 7,277,895 | B2 * | 10/2007 | Parkinson .................... | 707/755 |
| 2001/0018697 | A1 * | 8/2001 | Kunitake et al. ............. | 707/517 |
| 2001/0056504 | A1 * | 12/2001 | Kuznetsov .................... | 709/310 |
| 2003/0106021 | A1 * | 6/2003 | Mangrola ..................... | 715/513 |
| 2005/0086584 | A1 * | 4/2005 | Sampathkumar et al. . | 715/501.1 |
| 2005/0097530 | A1 * | 5/2005 | Asao et al. ................... | 717/140 |
| 2005/0273772 | A1 * | 12/2005 | Matsakis et al. ............. | 717/136 |
| 2005/0289125 | A1 * | 12/2005 | Liu et al. ........................ | 707/3 |
| 2006/0005138 | A1 * | 1/2006 | Rohwedder et al. .......... | 715/748 |
| 2006/0242563 | A1 * | 10/2006 | Liu et al. ....................... | 715/513 |
| 2007/0208997 | A1 * | 9/2007 | Jiang et al. .................... | 715/523 |
| 2008/0086682 | A1 * | 4/2008 | Derricott et al. .............. | 715/239 |

* cited by examiner

*Primary Examiner* — Isaac Tecklu
(74) *Attorney, Agent, or Firm* — Sterne, Kessler, Goldstein & Fox P.L.L.C.

(57) ABSTRACT

Embodiments of the present invention provide a system that facilitates converting a template written in a templating language into a function written in a host language, wherein the function produces a string (or a capability that encapsulates a string) in the templated language. During operation, the system receives a template in the templating language at a translator. The system then compiles the template with the translator to create a function in the host language. Next, the system merges the function in the host language with a subset of code written in the host language. Note that in some embodiments of the present invention, the subset of code written in the host language was originally embedded in the templating language, while in other embodiments the subset of code written in the host language is received from an external file. The system then converts the subset of code written in the host language into a safe subset of code written in the host language, wherein the safe subset of code written in the host language adheres to a pre-determined schema and a pre-determined set of constraints. Finally, the system translates the safe subset of code written in the host language to a subset of code written in the templated language.

19 Claims, 4 Drawing Sheets

USING A TEMPLATING LANGUAGE TO PRODUCE A HOST LANGUAGE FACTORY FOR A SAFE SUBSET OF A TEMPLATED LANGUAGE

BACKGROUND

1. Field of the Invention

The present invention relates to programming languages. More specifically, the present invention relates to a method and an apparatus for using a templating language to produce a host language factory for a safe subset of a templated language.

2. Related Art

Templating languages are widely used to dynamically produce output in a host language, wherein the output combines elements of the host language with elements specific to the templating language. In particular, these templating languages are most often used for translating markup languages (languages that mark text with "tags" that describe attributes of contiguous snippets of code), but templating is not restricted to markup languages.

Templating languages also usually include an "expression language" used to express conditions, and sometimes to specify the relationship between inputs and dynamic content in the output. For example, Java Server Pages (JSPs) use Java as the expression language.

Some templating languages have a mechanism for determining whether a string is in a subset of a host language. For example, Document Type Definitions (DTDs) perform this function for eXtensible Markup Language (XML), and Database schemas can be used to validate SQL in this manner. However, these schemas typically do not do a good job of handling languages that embed other languages. For example, in a DTD, it is not possible to specify that the value of an attribute is a Uniform Resource Identifier (URI).

Schemas also only answer the question of whether a snippet of the language is valid in isolation, so schemas cannot express some checks to determine whether languages share identifiers.

Furthermore, schemas cannot distinguish between snippets of a language that must be subject to rigorous tests and snippets of language that come from a privileged source and only need to pass checks to ensure that they are well-formed.

SUMMARY

Embodiments of the present invention provide a system that facilitates converting a template written in a templating language into a function written in a host language, wherein the function produces a string (or a capability that encapsulates a string) in the templated language.

During operation, the system receives a template in the templating language at a translator. The system then compiles the template with the translator to create a function in the host language. Next, the system merges the function in the host language with a subset of code written in the host language. Note that in some embodiments of the present invention, the subset of code written in the host language was originally embedded in the templating language, while in other embodiments the subset of code written in the host language is received from an external file. The system then converts the subset of code written in the host language into a safe subset of code written in the host language, wherein the safe subset of code written in the host language adheres to a pre-determined schema and a pre-determined set of constraints. Finally, the system translates the safe subset of code written in the host language to a subset of code written in the templated language.

In some embodiments of the present invention, the subset of code written in the templated language comprises a function that produces a capability of the templated language, wherein the function takes zero or more parameters.

In some embodiments of the present invention, compiling the template involves parsing the template to create a first abstract syntax tree. In these embodiments, merging the function in the host language with the subset of code written in the host language involves parsing the subset of code written in the host language to create a second abstract syntax tree, and merging the host language function compiled from the first abstract syntax tree with the second abstract syntax tree to create a third abstract syntax tree in the host language. Note that in some embodiments of the present invention, when the host language code is extracted to create the abstract syntax trees, the extracted code is replaced with function calls to the extracted code.

In some embodiments of the present invention, the system ensures that the template adheres to a pre-determined schema of the templating language. The system also ensures that the subset of code written in the templated language adheres to a pre-determined schema of the templated language.

In some embodiments of the present invention, the system ensures that the template adheres to a pre-determined set of constraints. The system also ensures that the subset of code written in the templated language adheres to a pre-determined set of constraints.

In some embodiments of the present invention, translating the safe subset of code written in the host language to the subset of code written in the templated language further involves determining that an element within the safe subset of code written in the host language comprises a dynamic value. The system then wraps the dynamic value with host language code that allows the dynamic value to be translated to the templated language upon execution of the subset of code written in the templated language. Note that in some embodiments of the present invention, dynamic values are always specified in the expression language.

In some embodiments of the present invention, the templating language prohibits suppressing an exception.

In some embodiments of the present invention, a property of the function in the templating language is preserved in the templated language. For example, the resulting function in the templated language operates exactly as the function in the templating language was designed to operate. The translation of the function from the templating language to the templated language is side-effect free.

In some embodiments of the present invention, compiling the template involves parsing the template to create a first Document Object Model (DOM). In these embodiments, merging the function in the host language with the subset of code written in the host language involves parsing the subset of code written in the host language to create a second DOM, and merging the first DOM with the second DOM to create a third DOM. Furthermore, translating the safe subset of code written in the host language to the subset of code written in the templated language involves creating the subset of code written in the templated language from the third DOM.

In some embodiments of the present invention, the subset of code written in the templated language is a function that takes zero or more parameters, and which produces a capability in the templated language.

DETAILED DESCRIPTION

Figure 1:
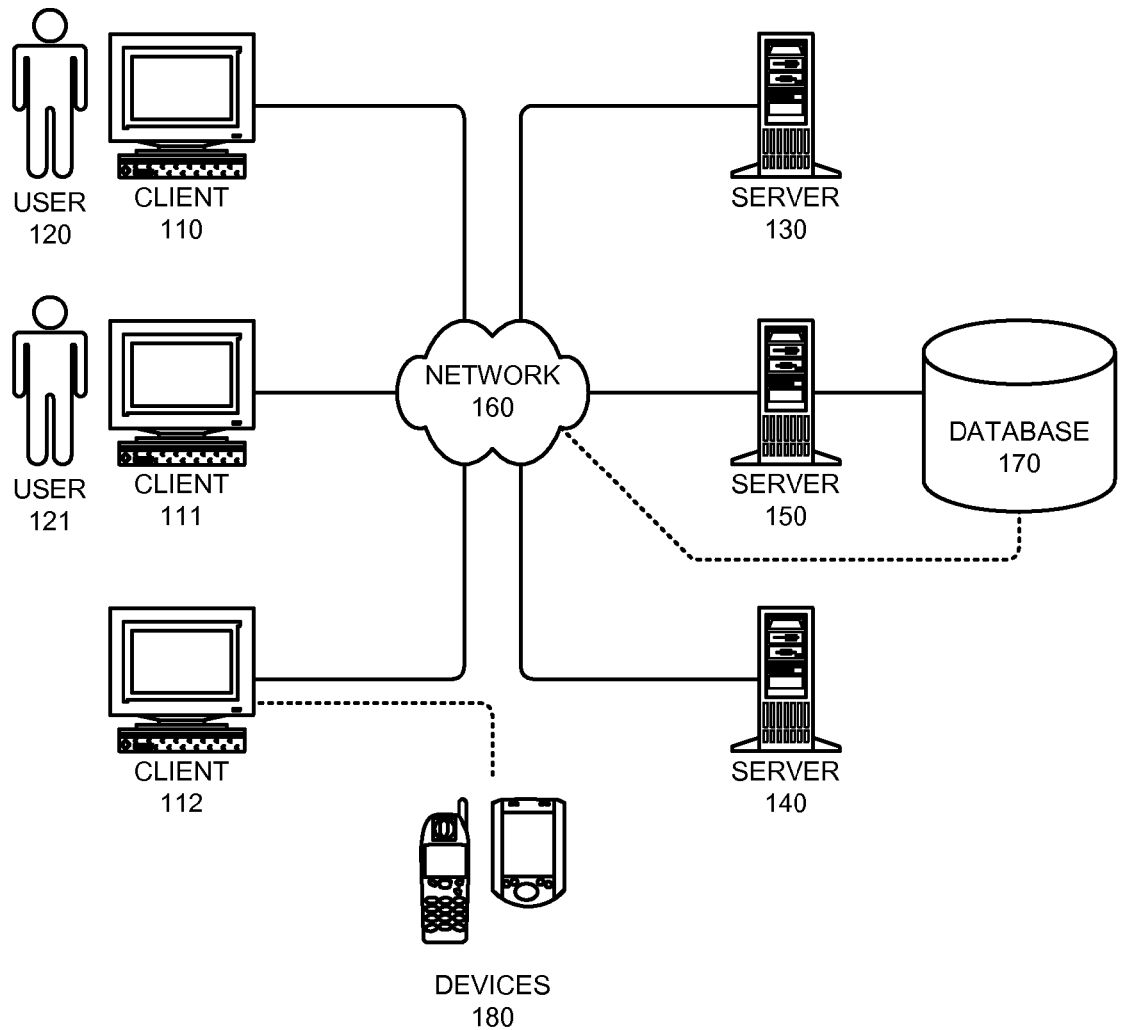
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present invention provide a technique for dynamically producing content, from one language (the host language) to another language (the templated language), which is a known safe subset of the templated language. In some embodiments, the subset of the templated language is configurable—some aspects need to work based on configurable whitelists. Moreover, the host language and templated language can share identifiers (for example, HyperText Markup Language (HTML) DOM node IDs may become global variables in JavaScript), and the templated language in turn comprises snippets of the host language (for example, "<script>" tags in HTML) and other languages which may need to be restricted to a safe-subset.

In some embodiments, there may be privileged code in the host language which needs to declare that a string is known to be safe so that the string can be included in a safe context in the templated language without re-interpretation. For example, a What-You-See-Is-What-You-Get (WYSIWYG) HTML editor might produce HTML that should appear in a preview produced from an HTML template.

Note that in embodiments of the present invention, the templating language, by default, is injection-free. In other words, the system does not interpret dynamic content as strings in the templated language. Exemptions are allowed if templated-language-capabilities are passed in as input.

In some embodiments of the present invention, the host language supports functions that can be supplied with parameters and produce a value, and wherein the host language's local variables are not visible outside the function. In these embodiments, C is not a suitable host language because a function can reach back up the stack to get variables from a calling function.

In some embodiments, the templating language's expression language is "safe" in the sense that it cannot access information that the host language would not otherwise have access to, and cannot produce side-effects that the host language does not have access to. This can be achieved by designing an expression language that is safe, or by using the host language as the expression language.

In some embodiments, for each language in the language group (the templating language, the host language, and the templated language), the system defines a schema. The schema specifies which language constructs can appear where (for example, a TITLE element can appear inside a HEAD element), and the types of literal values that can be used (for example, the type of the HTML href attribute is a Uniform Resource Locator (URL)). The types also specify the other languages in a group (for example, the HTML onclick handler's type is an expression in the JavaScript language), so they can be subjected to the schema and constraints for the specified language.

For each language, the system also defines a constraint set. The constraint set specifies the allowable values for each type in the language. Since the template is a mix of static and dynamic content, the constraint set can specify not only allowable values for the static case, but can also specify a mechanism in the host language by which dynamic content can be approved.

Finally, for each language, the system specifies a set of transformations. These transformations are intended to convert unsafe constructs in the templated language into safe constructs, so where identifiers are shared between languages, identifiers can be rewritten so that they are no longer shared. For example, in HTML and JavaScript, the system can prefix HTML IDs with a string that makes them invalid JavaScript IDs.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Note that different embodiments of the present invention may use different configurations, and are not limited to the configuration illustrated in computing environment 100.

In some embodiments of the present invention, the code written in the templated language, the code written in the host language, and the code written in the templating language all exist on the same computer system, such as client 110 or server 130. In other embodiments of the present invention, the code written in these languages exist on different computer systems. Note that the processing from the template to the templated language may occur on client 110, server 130, or any combination of computing systems.

Compilation from Templating Language to Host Language

Figure 2:
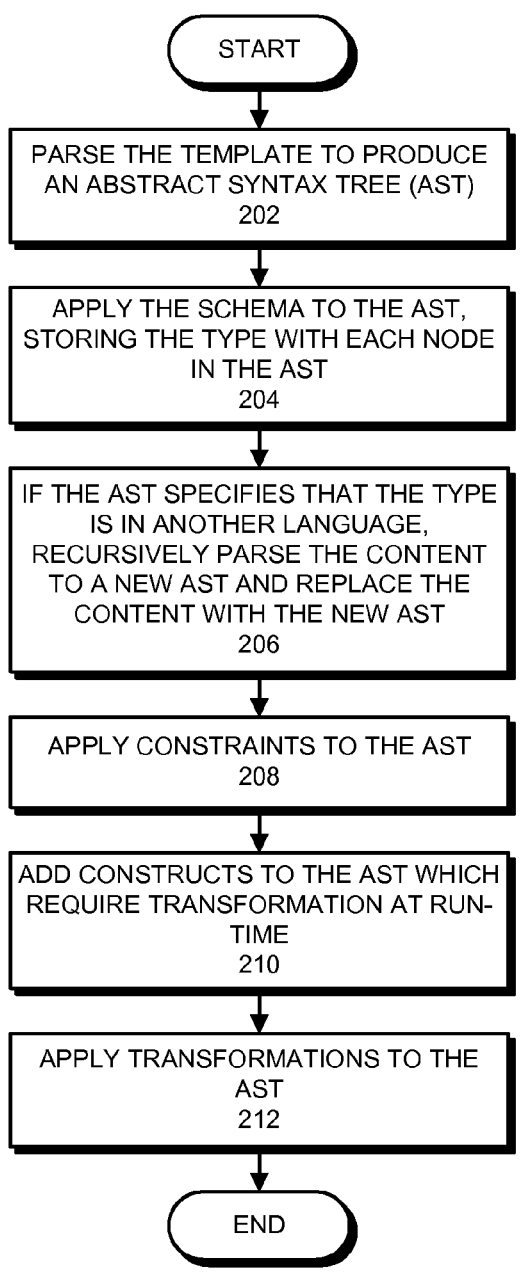
FIG. 2 presents a flow chart illustrating the process of compiling code from the templating language to the host language in accordance with an embodiment of the present invention.

FIG. 2 presents a flow chart illustrating the process of compiling code from the templating language to the host language in accordance with an embodiment of the present invention.

In some embodiments of the present invention, the template is compiled to a function in the host language. Compilation from templating language to host language function proceeds as follows.

First, the system, parses the template to produce an Abstract Syntax Tree (AST) (operation 202). Next, the system applies the schema to the AST, and in doing so, stores the type with each node in the AST (operation 204). If the AST specifies that the type is in another language, the system recursively parses the content to an AST and replaces the content with the AST before applying that language's schema to the newly parsed AST (operation 206).

Note that if the host language is dealing with more than one templated language (for example, defining templates for both HTML and Cascading Style Sheets (CSS)) and one of the templated languages is embedded within the other templated language, then the system identifies dynamic content which can be compiled to a host language separately, and replaced the dynamic content with a function call to that compiled template. For example, if a template for HTML takes a parameter p, and a STYLE tag contains CSS which depends upon p (in either the HTML template's expression language or the CSS template's expression language) then this CSS template is extracted and replaced with a function call that takes p as an argument. This is illustrated by the example:

<template><param name="p"/><html:style>
width: $(p) cm</html:style></template> where the $(p) is a placeholder in a CSS templating language.

Next, the system applies constraints to the AST (operation 208). If any of the constraints fail, the process fails and halts. Where content is dynamic, the system adds runtime checks that will abort function execution upon failure of the constraints. The system also adds to the AST any constructs which require transformation but do not appear because the constructs are allowed to assume some default value (operation 210). Finally, the system applies transformations to the AST (operation 212). Note that static values can be transformed immediately, and dynamic values may be wrapped with code that performs the transformation at runtime, or aborts if transformation is not possible.

Processing the Transformed Function

Figure 3:
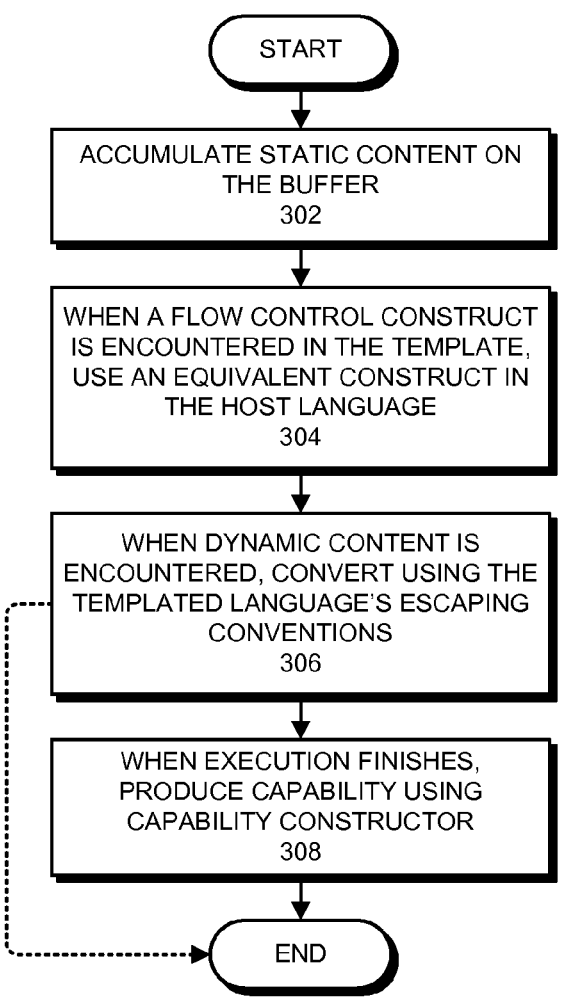
FIG. 3 presents a flow chart illustrating a technique for processing the transformed function in accordance with an embodiment of the present invention.

FIG. 3 presents a flow chart illustrating processing of the transformed function in accordance with an embodiment of the present invention.

In some embodiments of the present invention, the function produced in the host language takes one or multiple parameters and produces a capability of the templated language's type. Note that the function's name can be specified in the template (JSPs and XSL templates both can have name attributes), or the name can be inferred from the source code file, or can be specified in some external mapping. The system can process this function as follows.

First, the function defines a buffer that is used by the system to accumulate the templating language's output. This buffer is not modifiable via the templating language's expression language.

During operation, the function accumulates static content onto this buffer (operation 302). When a flow-control construct is encountered in the template, the system uses an equivalent construct in the host language (operation 304). When dynamic content is encountered, the dynamic content is converted using the templated language's escaping conventions (operation 306), unless the dynamic content is a capability of the templated language's type. If the latter case is true, then the dynamic content is accumulated onto the buffer if the dynamic content is allowed to appear in that context. Otherwise, the function execution is aborted (as is indicated by the dashed line). Finally, when execution finishes, the function produces a capability using a capability constructor (operation 308). Note that this constructor is not callable via the templating language's expression language or from host language snippets extracted from the templating language (normal function scoping makes similar language unnecessary for the output buffer).

Note that if the host language is used as the expression language, then the system can guarantee the expression language restrictions by disallowing access to specific identifiers. In this case, the expression language becomes a subset of the host language minus these identifiers.

Figure 4:
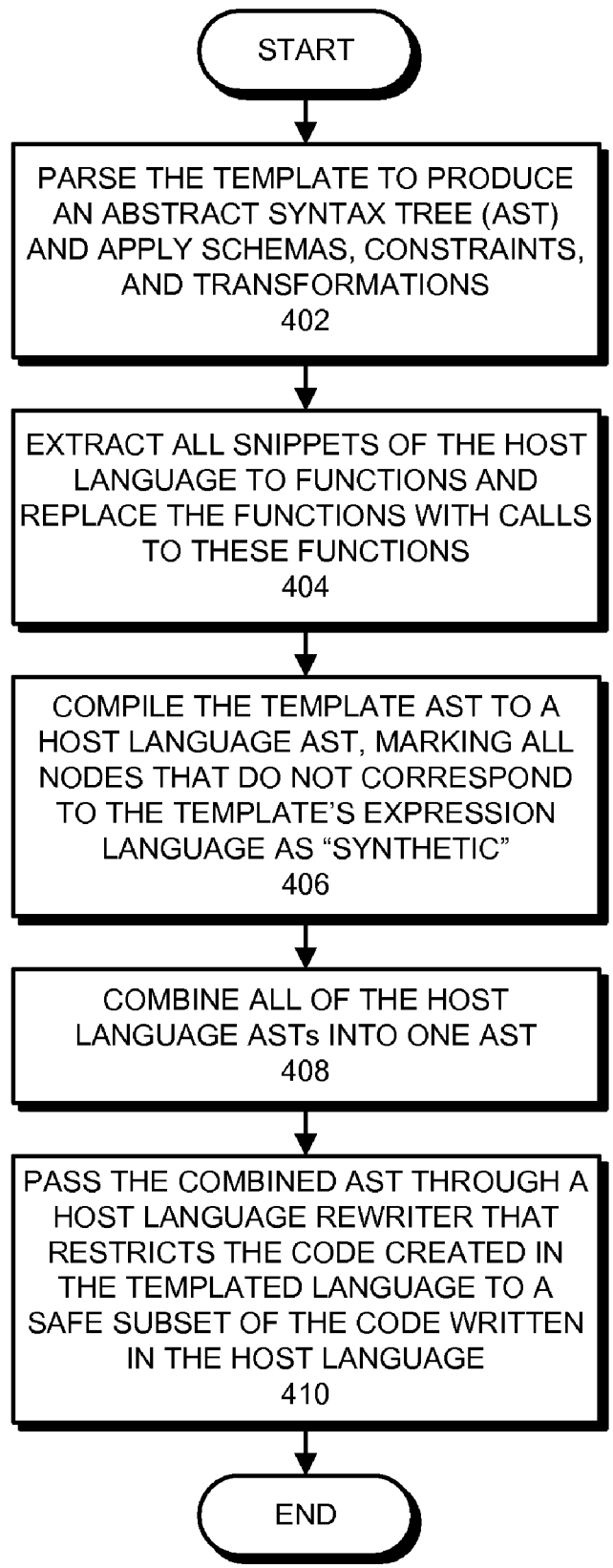
FIG. 4 presents a flow chart illustrating the process of extending to unsafe host languages when the expression language is the host language in accordance with an embodiment of the present invention.

Extending to Unsafe Host Languages when the Expression Language is the Host Language FIG. 4 presents a flow chart illustrating the process of extending to unsafe host languages when the expression language is the host language in accordance with an embodiment of the present invention.

If the host language is itself unsafe, then it must be restricted to a safe subset to be used in a secure environment. In this case, the system rewrites ASTs to guarantee a safe subset of the templated language. The system also applies the same AST rewriting to the host language. The system then proceeds as follows.

First, the template parser produces an AST and applies schemas, constraints, and transformations (operation 402). Next, the system extracts all snippets of the host language to functions and replaces the functions with calls to these functions (operation 404). The system also compiles the template AST to a host language AST, marking all nodes that do not correspond to the template's expression language as "synthetic" (operation 406). Next, the system combines all the host language ASTs (compiled template functions, functions extracted from templates, and other host language code) into one AST (operation 408). Finally, the system passes the combined AST through a host language rewriter that restricts the code created in the templated language to a safe subset of the code written in the host language (operation 410). However, note that the system does not apply the same restrictions to "synthetic nodes".

Assuming that the schemas, constraints, and transformations define a safe subset of the templated language, the compiled function is considered safe if it has the following properties: (1) all runtime constraints and transformation violations must halt function execution (for example, the expression language should not allow for suppressing exceptions thrown by runtime checks); (2) dynamic content that is not a templated language capability can be specified to preserve the dynamic content's literal meaning in the context in which the dynamic content is encountered (use JavaScript escaping inside script tags, and JavaScript escaping and then HTML escaping inside onclick handlers); (3) the output buffer is not accessible from expression language; and (4) the capability constructor is not accessible from the expression language.

Because of property (1), the system can determine that if the function returns normally, then all constraints were successfully enforced. Because of property (2), the system can determine that that dynamic content will be interpreted literally, instead of as a chunk of another language. Because of property (3), the system can determine that only content that passed schema verification, constraint verification, and transformation made it onto the buffer. Because of property (4), the system can determine that the capability returned is the capability created from the buffer content.

Note that this system does not interfere with desirable properties of templating languages. For example, if the expression language code in the function has no side effects, then the resulting function will have no side effects, which allows for precomputation and reuse of the returned capabilities. Furthermore, since the output from one function compiled from a template can be passed into another language, and is not escaped (assuming it is appropriate in the context in which it is included), templates can be broken into functions that can call one another, allowing functional decomposition of templates. Also note that if the expression language code in a particular template is pure and the capability constructor is pure, then the resulting function is pure, so the compiled template is independently testable and can be used in a delayed execution environment.

Exemplary Architecture

Figure 5:
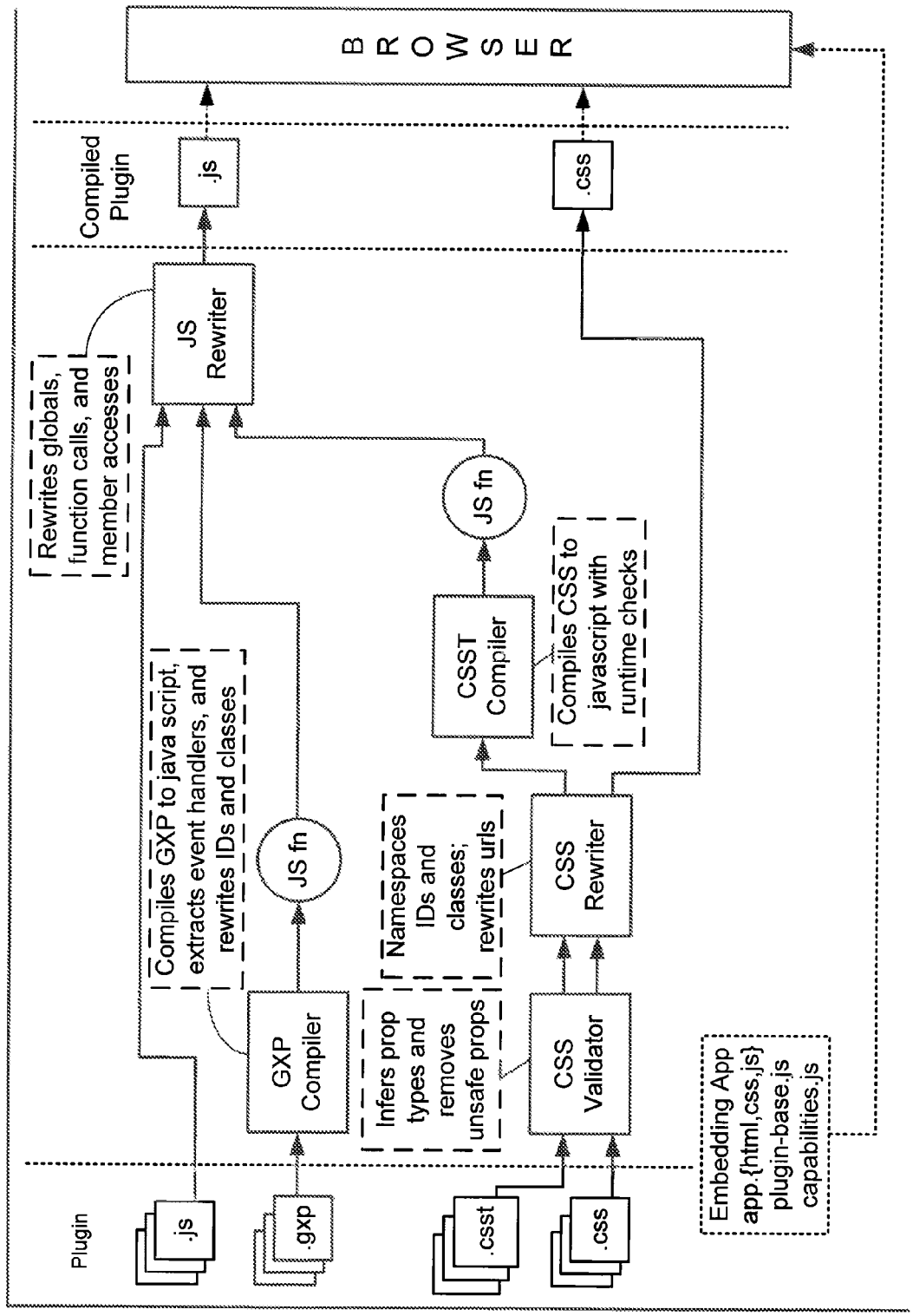
FIG. 5 illustrates an exemplary architecture of a code rewriting system that takes host-language inputs (JS), and template inputs (HTML,CSS), and that produces constrained output in two host languages (JS and CSS).

FIG. 5 illustrates an exemplary architecture of a code rewriting system that takes host-language inputs (JS), and template inputs (HTML,CSS), and that produces constrained output in two host languages (JS and CSS). Embodiments of the present invention are not meant to be limited to this exemplary architecture.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for converting a template written in a templating language, the method comprising:
receiving the template in the templating language at a translator;
compiling the template with the translator to create a function in the host language;
merging the function in the host language with a subset of code written in the host language;
converting the subset of code written in the host language into a safe subset of code written in the host language, wherein the safe subset of code written in the host language adheres to a pre-determined schema and a pre-determined set of constraints; and
translating the safe subset of code written in the host language to a subset of code written in a templated language, wherein the translating comprises:
determining that an element within the safe subset of code written in the host language comprises a dynamic value, and
wrapping the dynamic value with host language code that allows the dynamic value to be translated to the templated language upon execution of the subset of code written in the templated language.

2. The method of claim 1, wherein the subset of code written in the templated language comprises a function that produces a capability of the templated language, wherein the function takes zero or more parameters.

3. The method of claim 1:
wherein compiling the template involves parsing the template to create a first abstract syntax tree; and wherein merging the function in the host language with the subset of code written in the host language involves parsing the subset of code written in the host language to create a second abstract syntax tree, and merging the first abstract syntax tree with the second abstract syntax tree to create a third abstract syntax tree.

4. The method of claim 1, further comprising:
ensuring that the template adheres to a pre-determined schema of the templating language; and
ensuring that the subset of code written in the templated language adheres to a pre-determined schema of the templated language.

5. The method of claim 1, further comprising:
ensuring that the template adheres to a pre-determined set of constraints; and
ensuring that the subset of code written in the templated language adheres to a pre-determined set of constraints.

6. The method of claim 1, wherein the templating language prohibits suppressing an exception.

7. The method of claim 1, wherein a property of the function in the templating language is preserved in the templated language.

8. The method of claim 1:
wherein compiling the template involves parsing the template to create a first Document Object Model (DOM);
wherein merging the function in the host language with the subset of code written in the host language involves parsing the subset of code written in the host language to create a second DOM, and merging the first DOM with the second DOM to create a third DOM; and
wherein translating the safe subset of code written in the host language to the subset of code written in the templated language involves creating the subset of code written in the templated language from the third DOM.

9. The method of claim 1, wherein the subset of code written in the templated language is a function that takes zero or more parameters, and which produces a capability in the templated language.

10. A computer-readable storage medium storing instructions that when executed by a computer cause the computer to perform a method for converting a template written in a templating language, the method comprising:
- receiving the template in the templating language at a translator;
- compiling the template with the translator create a function in the host language;
- merging the function in the host language with a subset of code written in the host language;
- converting the subset of code written in the host language into a safe subset of code written in the host language, wherein the safe subset of code written in the host language adheres to a pre-determined schema and a pre-determined set of constraints; and
- translating the safe subset of code written in the host language to a subset of code written in a templated language, wherein the translating comprises:
  - determining that an element within the safe subset of code written in the host language comprises a dynamic value, and
  - wrapping the dynamic value with host language code that allows the dynamic value to be translated to the templated language upon execution of the subset of code written in the templated language.

11. The computer-readable storage medium of claim 10, wherein the subset of code written in the templated language comprises a function that produces a capability of the templated language, wherein the function takes zero or more parameters.

12. The computer-readable storage medium of claim 10:
- wherein compiling the template involves parsing the template to create a first abstract syntax tree; and
- wherein merging the function in the host language with the subset of code written in the host language involves parsing the subset of code written in the host language to create a second abstract syntax tree, and merging the first abstract syntax tree with the second abstract syntax tree to create a third abstract syntax tree.

13. The computer-readable storage medium of claim 10, wherein the method further comprises:
- ensuring that the template adheres to a pre-determined schema of the templating language; and
- ensuring that the subset of code written in the templated language adheres to a pre-determined schema of the templated language.

14. The computer-readable storage medium of claim 10, wherein the method further comprises:
- ensuring that the template adheres to a pre-determined set of constraints; and
- ensuring that the subset of code written in the templated language adheres to a pre-determined set of constraints.

15. The computer-readable storage medium of claim 10, wherein the templating language prohibits suppressing an exception.

16. The computer-readable storage medium of claim 10, wherein a property of the function in the templating language is preserved in the templated language.

17. The computer-readable storage medium of claim 10:
- wherein compiling the template involves parsing the template to create a first Document Object Model (DOM);
- wherein merging the function in the host language with the subset of code written in the host language involves parsing the subset of code written in the host language to create a second DOM, and merging the first DOM with the second DOM to create a third DOM; and
- wherein translating the safe subset of code written in the host language to the subset of code written in the templated language involves creating the subset of code written in the templated language from the third DOM.

18. The computer-readable storage medium of claim 10, wherein the subset of code written in the templated language is a function that takes zero or more parameters, and which produces a capability in the templated language.

19. A computing system configured to convert a template written in a templating language into a function written in a host language, comprising:
- a receiving mechanism, implemented on a computing system including memory, configured to receive a template in the templating language at a translator;
- a compilation mechanism, implemented on a computing system including memory, configured to compile the template with the translator to create a function in the host language;
- a merging mechanism, implemented on a computing system including memory, configured to merge the function in the host language with a subset of code written in the host language;
- a conversion mechanism, implemented on a computing system including memory, configured to convert the subset of code written in the host language into a safe subset of code written in the host language, wherein the safe subset of code written in the host language adheres to a pre-determined schema and a pre-determined set of constraints; and
- a translation mechanism, implemented on a computing system including memory, configured to translate the safe subset of code written in the host language to a subset of code written in a templated language by:
  - determining that an element within the safe subset of code written in the host language comprises a dynamic value, and
  - wrapping the dynamic value with host language code that allows the dynamic value to be translated to the templated language upon execution of the subset of code written in the templated language.

* * * * *

UNITED STATES PATENT AND TRADEMARK OFFICE
CERTIFICATE OF CORRECTION

PATENT NO.         : 8,191,038 B1                                       Page 1 of 1
APPLICATION NO.    : 11/869645
DATED              : May 29, 2012
INVENTOR(S)        : Samuel et al.

It is certified that error appears in the above-identified patent and that said Letters Patent is hereby corrected as shown below:

Column 9
Line 7, Claim 10, please replace "translator create" with --translator to create--.

Signed and Sealed this
Twenty-fifth Day of September, 2012

David J. Kappos
*Director of the United States Patent and Trademark Office*